(12) United States Patent
Doering et al.

(10) Patent No.: US 7,762,924 B2
(45) Date of Patent: Jul. 27, 2010

(54) TRANSMISSION SHIFTING RESPONSIVE TO BORDERLINE KNOCK LIMITS

(75) Inventors: Jeff Allen Doering, Canton, MI (US); Michael John Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 11/933,816

(22) Filed: Nov. 1, 2007

(65) Prior Publication Data

US 2009/0118092 A1    May 7, 2009

(51) Int. Cl.
*F16H 59/74* (2006.01)
(52) U.S. Cl. ...................................................... 477/102
(58) Field of Classification Search .................. 477/101, 477/102
See application file for complete search history.

(56) References Cited

U.S. PATENT DOCUMENTS

| | | | |
|---|---|---|---|
| 4,630,583 A * | 12/1986 | Suzuki et al. ............... | 477/102 |
| 4,853,720 A | 8/1989 | Onari et al. | |
| 4,939,956 A * | 7/1990 | Takizawa ..................... | 477/152 |
| 4,966,117 A * | 10/1990 | Kawamura ............. | 123/406.35 |
| 5,162,997 A | 11/1992 | Takahashi | |
| 5,163,402 A | 11/1992 | Taguchi et al. | |
| 5,806,009 A | 9/1998 | Horiguchi | |
| 6,044,318 A | 3/2000 | Bourdon et al. | |
| 6,090,012 A | 7/2000 | Hollingsworth et al. | |
| 6,157,886 A | 12/2000 | Janecke | |
| 6,813,550 B2 | 11/2004 | Minami | |
| 6,929,581 B2 * | 8/2005 | Sugimura ..................... | 477/102 |
| 6,941,210 B2 * | 9/2005 | Kondo et al. ................... | 701/54 |
| 6,985,804 B2 | 1/2006 | Minami | |
| 7,247,124 B2 * | 7/2007 | Tamai ......................... | 477/115 |

\* cited by examiner

*Primary Examiner*—Dirk Wright
(74) *Attorney, Agent, or Firm*—Julia Voutyras; Alleman Hall McCoy Russell & Tuttle LLP

(57) ABSTRACT

A method for operating an engine and transmission in a vehicle is described. The method comprises up-shifting the transmission based on whether engine knock limits spark advance at engine conditions after the up-shift. Further, the method may include accounting for differences in fuel types, and their effects on engine knock in future gears.

19 Claims, 6 Drawing Sheets

TRANSMISSION SHIFTING RESPONSIVE TO BORDERLINE KNOCK LIMITS

SUMMARY AND BACKGROUND

Various methods for operating transmission systems, and controlling shifting of transmissions in vehicles, have been implemented to increase the gas mileage of the vehicle.

In one approach, U.S. Pat. No. 6,813,550, the shifting of the transmission can be adjusted based on a prediction of fuel economy before and after the shift. For example, the predictive system allows the transmission to up-shift when the fuel economy predicted after the shift is decreased. The up-shift is carried out automatically, regardless of the intention of the driver. A fuel consumption ratio map is used to predict what effect the up-shift will have on fuel economy. The ratio map stipulates the relationship between fuel economy, engine speed, and engine torque.

However, the inventors herein have recognized various issues with the above approach. Specifically, due to the varied ambient conditions experienced by the vehicle, the system may incorrectly predict that the up-shift will increase fuel economy. In particular, for a given speed and torque under some ambient conditions, such as cold temperatures and/or high humidity ambient conditions, the system may predict, correctly, that the up-shift will increase fuel economy. However, for the same speed and torque condition, but under different ambient conditions, such has hot temperatures and/or low humidity ambient conditions, the system may predict, incorrectly, that the up-shift will increase fuel economy. Under these latter conditions, spark knock may occur, thus resulting in a retarded ignition timing—where the retarded ignition timing causes the fuel economy to actually decrease after the up-shift.

Thus, in one approach, a method for operating an engine and transmission in a vehicle is provided. The method comprises up-shifting the transmission based on whether engine knock limits spark advance at engine conditions after the up-shift. For example, the decision as to whether to execute an up-shift at the current conditions may take into account ambient effects on engine knock, and the corresponding ignition timing retard, in identifying whether fuel flow will actually decrease in the up-shifted gear.

DETAILED SPECIFICATION

Figure 1:
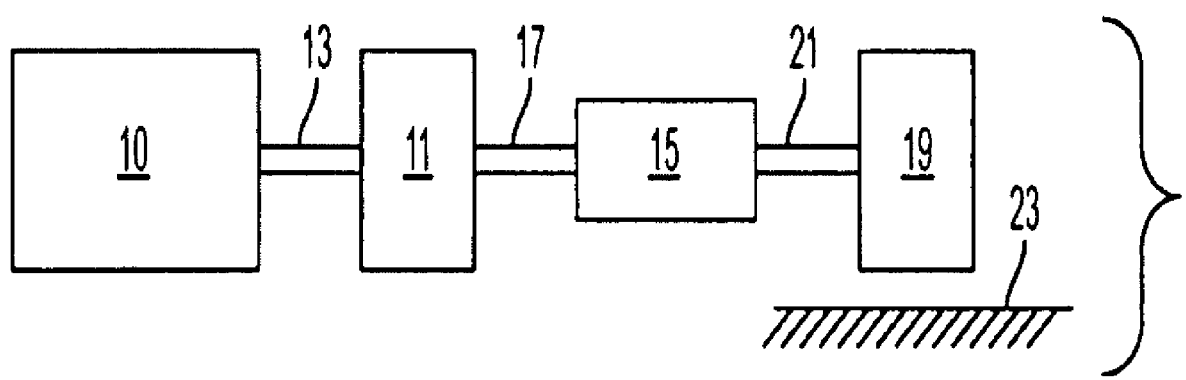
FIG. 1 is a block diagram of a vehicle illustrating various powertrain components.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or being disengaged, the torque converter is said to be in an unlocked state. Turbine shaft 17 is also known as transmission input shaft. In one embodiment, transmission 15 comprises an electronically controlled transmission with a plurality of selectable discrete gear ratios. Transmission 15 may also comprises various other gears, such as, for example, a final drive ratio (not shown). Alternatively, transmission 15 may be a continuously variable transmission (CVT).

Transmission 15 may further be coupled to tire 19 via axle 21. Tire 19 interfaces the vehicle (not shown) to the road 23. Note that in one example embodiment, this powertrain is coupled in a passenger vehicle that travels on the road.

Figure 2A:
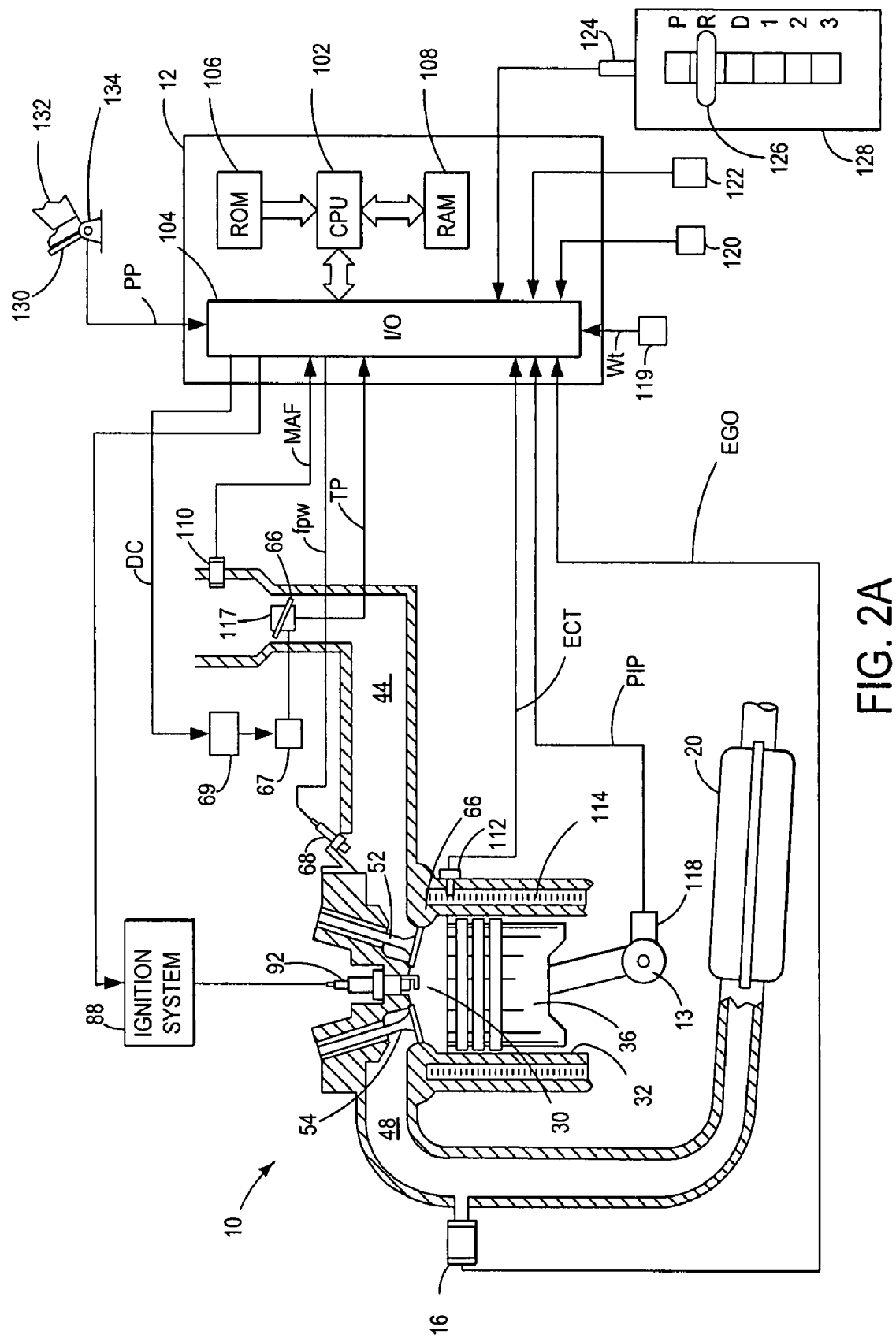
FIG. 2A is a block diagram of an engine.

Internal combustion engine 10 comprising a plurality of cylinders, one cylinder of which is shown in FIG. 2A, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having port fuel injector 68 coupled thereto for delivering fuel in proportion to the pulse width of signal (fpw) from controller 12. In alternate embodiments the fuel injector may inject fuel directly into the combustion chamber. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17; and a profile ignition pickup signal (PIP) from Hall effect sensor 118 coupled to crankshaft 13 indicating an engine speed (N). Alternatively, turbine speed may be determined from vehicle speed and gear ratio. In alternate embodiment humidity sensor 122 may be integrated with temperature sensor 120 or the humidity sensor 122 may be left out.

Continuing with FIG. 2A, controller 12 receives various signals from other sensors that may be located in the vehicle, including: a measurement of ambient temperature from temperature sensor 120; a measurement of ambient humidity from humidity sensor 122; and a measurement of the position of the shifting column from sensor 124, coupled to shifting column 126. In some embodiment the humidity sensor may be integrated with temperature sensor 120. In alternate embodiments the humidity sensor may be removed. The position of the shifting column is sent to controller 12. The controller may further send signals to transmission 11 and gear box 15, where the desired gear ratio is assigned. In this embodiment 5 modes can be selected by the shifting column, park, reverse, drive, first gear, second gear, and third gear. In alternate embodiments the number of modes that the shifting column can select may be adjusted; i.e. the shifting column may only have a drive, reverse, and a park mode. Accelerator pedal 130 is shown communicating with the driver's foot 132. Accelerator pedal position (PP) is measured by pedal position sensor 134 and sent to controller 12.

Figure 2B:
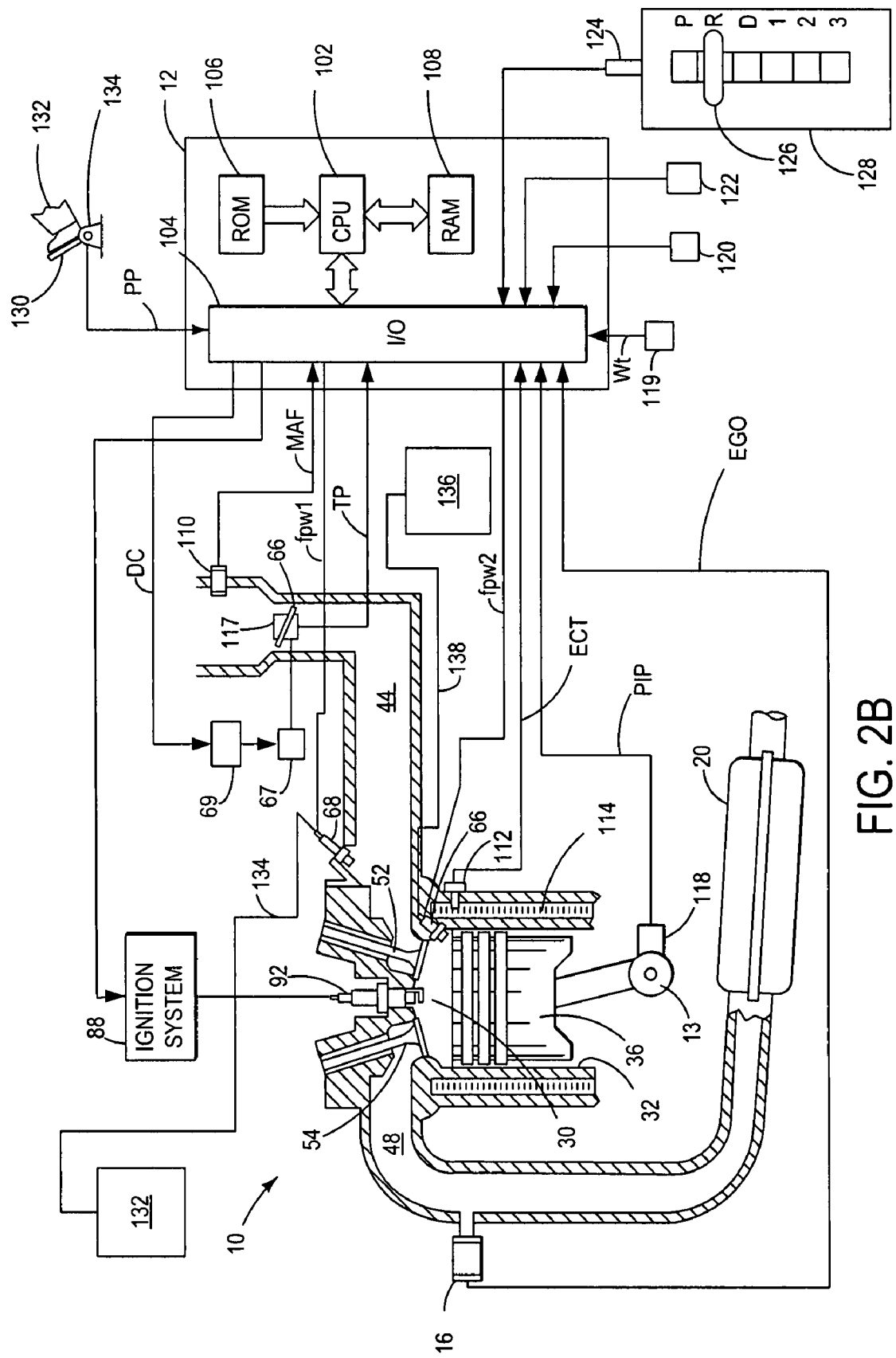
FIG. 2B is an alternate embodiment of a block diagram of an engine.

FIG. 2B shown an alternate embodiment of the system shown in FIG. 2A, similar components are marked accordingly. In this embodiment port injector 68 and direct injector 66 are both used to deliver fuel for combustion. Port injector 68 is fluidly coupled to fuel tank 132 by fuel line 134. Fuel tank 132 may contain gasoline, ethanol, and/or methanol. One or multiple fuel pumps (not shown) may be located inside of fuel tank 134. Alternatively or additionally one or multiple fuel pumps may be coupled to fuel line 132. The fuel tank may contain a fuel level sensor (not shown) and a fuel composition sensor (not shown). The fuel level sensor and the fuel composition sensor send signals to controller 12. Port injector 68 receives a pulse width signal (fpw1) from controller 12.

Direct injector 66 is fluidly coupled to fuel tank 136 by fuel line 138. Fuel tank 136 may contain gasoline, ethanol, and/or methanol. One or multiple fuel pumps (not shown) may be located inside of fuel tank 138, or may be coupled to fuel line 136. Fuel tank may contain a fuel level sensor (not shown) and a fuel composition sensor (not shown). The fuel level sensor and the fuel composition sensor send signals to controller 12. Direct injector 66 receives a fuel pulse width signal (fpw2) from the controller. In one embodiment, the fuel system coupled to direct injector 66 may have a fuel with a higher concentration of alcohol (e.g., ethanol), and the fuel system coupled to injector 68. Further, a turbocharger may be coupled to the engine. In such an example, the controller 12 may adjust the relative amount of injection from the direct injector relative to the port injector in response to engine load, and further in response to engine knocking. Specifically, as load increases and/or knock increases, a greater amount of directly injected ethanol may be used to abate the knock or potential for knock.

Figure 3:
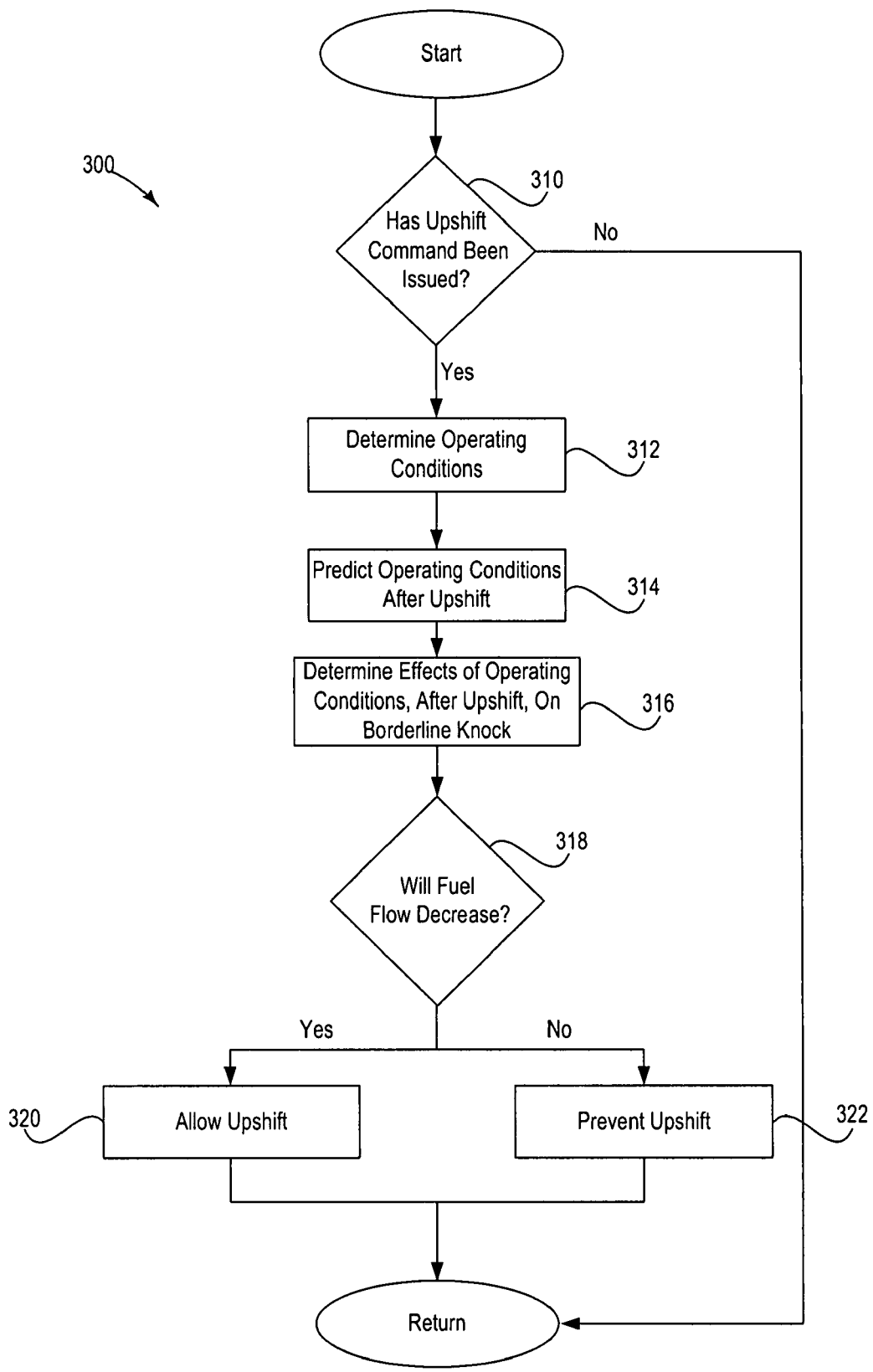
FIG. 3 is a routine used to control the engine and transmission.

FIG. 3 depicts a method for controlling the transmission. Method 300 is utilized to reduce an increase in fuel consumption by adjusting up-shifts that may result in a knock-limited ignition timing after the shift. Specifically, the routine modifies the up-shifting of the transmission based on a prediction of whether knock at the up-shifted conditions will result in spark retard, thus degrading the fuel economy gains of the shift.

At 310 it is determined whether or not a command has been issued to up-shift. In this embodiment the command may be based on a user input, such as shifting column 126, in an automatic transmission, and/or based on pedal position, vehicle speed, etc. The shifting column allows specific gear ratios or a range of gear ratios to be selected. Additionally, user input may come from a sensor or button associated with a cruise control system.

At 312 the operating conditions are determined. These operating conditions may include ambient temperature, ambient humidity, engine temperature, position of the shifting column, amount of fuel injected, intake airflow, throttle position, variable cam timing, vehicle or output shaft speed, current gear and gear ratio, torque converter slip, demanded engine torque, engine losses, exhaust gas oxygen content, pedal position, and crank angle. These conditions may be obtained from various sensors located in the engine and other parts of the vehicle.

The routine then proceeds to 314 where the operating conditions after the up-shift are predicted. This prediction may be carried out by the controller based on the known gear ratio of the future gear, current vehicle speed, engine actuator (variable cam timing, EGR, etc.) settings in new gear, expected level of converter slip in the new gear, demanded engine torque in the new gear and speed conditions, engine losses in new gear and speed conditions, etc.

The routine then advances to 316 where effects of ambient conditions and fuel composition are determined at the predicted up-shift conditions. Specifically, the routine may determine whether the current air temperature, coolant temperature, humidity, etc., may result in engine knock at the predicted up-shift conditions in the future gear. The routine may thereby determine whether the engine may be knock-limited (e.g., borderline limited), and thus whether spark retard (to abate the potential for knock) will be used. The determination may further be based on a fuel type and/or inferred octane to compensate for E85, premium fuel, engine deposits, etc.

The routine then advances to 318 where it is determined if the flowrate or brake-specific fuel consumption of the fuel will decrease after an up-shift. This calculation may be carried out by the controller where the difference between the current fuel consumption and the predicted fuel consumption is compared, taking into account the effect of the knock-limited spark in the up-shifted condition, if any. In some embodiment the controller may use a mode map to calculate the predicted the fuel consumption of the engine after an up-shift has been made. The mode map may take into account variables such as ambient temperature, ambient humidity, gear ratio, engine speed, and/or engine torque when predicting the fuel consumption of the engine in a higher gear. In other embodiments the controller may use a lookup table that uses ambient temperature, ambient humidity, and current gear position to calculate the predicted fuel consumption.

If the difference between the current fuel consumption and the predicted fuel consumption is positive, the routine will advance to 320 where an up-shift is performed by the transmission system. The routine will then return to the start. Additionally, the routine may utilize feedback from a knock sensor to determine whether borderline knock limits were actually encountered after the shift, and if so, may adapt the prediction of 316, for example.

Otherwise the transmission system will inhibit the up-shift. The routine will then return to the start.

In this way, up-shifting may be improved to take into account effects of knock-limits on spark timing in the future gear to better identify whether the up-shift will actually result in reduced fuel flow.

Figure 4:
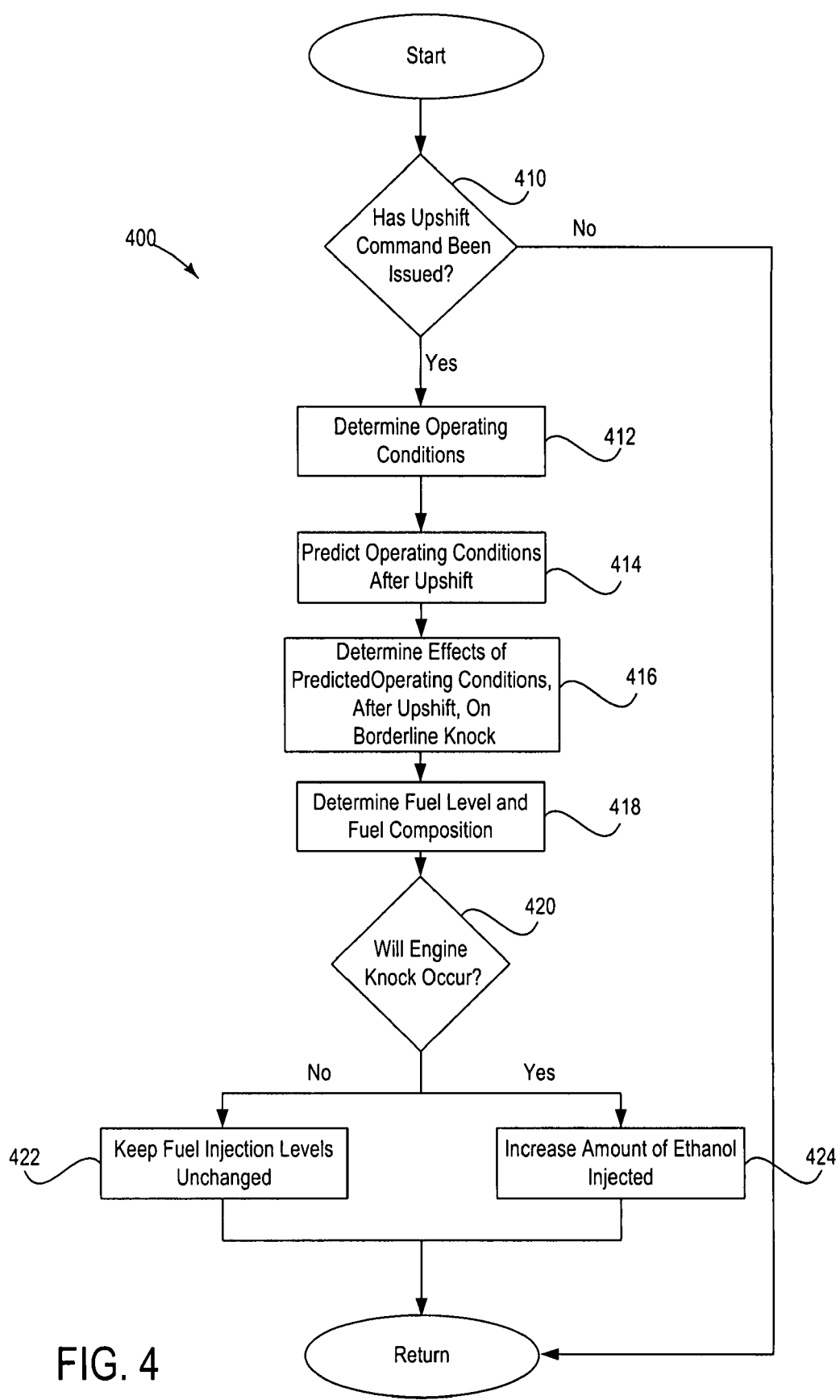
FIG. 4 is an alternate embodiment of a routine used to control the engine and transmission.

FIG. 4 shows an alternative embodiment of a method for controlling the transmission and the engine shown in FIG. 2B. In this embodiment fuel tank 136 contains a fuel with a higher percentage of ethanol than the fuel contained in fuel tank 132. For example fuel tank 132 may contain 10% ethanol and fuel tank 136 may contain 85% ethanol. Method 400 is utilized to reduce an increase in fuel consumption by relative fuel injection amounts before and after a shift in response to potentially rapid transitions into a knock-limited region.

Specifically, at 410 it is determined whether or not a command has been issued to up-shift. In this embodiment the command may be based on a user input, such as shifting column 126, in an automatic transmission, and/or based on pedal position, vehicle speed, etc. The shifting column allows specific gear ratios or a range of gear ratios to be selected. Additionally, user input may come from a sensor or button associated with a cruise control system.

At 412 the operating conditions are determined. These operating conditions may include ambient temperature, ambient humidity, engine temperature, position of the shifting column, amount of fuel injected, intake airflow, throttle position, exhaust gas oxygen content, pedal position, and crank angle. These conditions may be obtained from various sensors located in the engine and other parts of the vehicle.

The routine then proceeds to 414 where the operating conditions after the up-shift are predicted. This prediction may be carried out by the controller based on the known gear ratio of the future gear, current vehicle speed, engine torque, etc.

The routine then advances to 416 where effects of ambient conditions are determined at the predicted up-shift conditions. Specifically, the routine may determine whether the current air temperature, coolant temperature, humidity, etc., may result in engine knock at the predicted up-shift conditions in the future gear. The routine may thereby determine whether the engine may be knock-limited (e.g., borderline limited), and thus whether adjustment of relative fuel injection between the direct and port injector, thus reducing a tendency to knock, may be utilized in the future gear.

The routine then advances to 418 where the amount and composition of the fuel inside of both fuel tanks, 132 and 136, are calculated. The fuel level and the fuel composition may be determined by various sensors (not shown) located in both of the fuel tanks, and/or based on engine operating conditions. The routine then advances to 420 where the engine may be knock-limited after an up-shift is made at the current fuel delivery conditions.

If engine knock will not occur, the routine proceed to 422 where the fuel injection levels are unchanged and the shift is carried out. The routine will then return to the start.

On the other hand, if it is predicted that engine will be knock limited, rather than retard ignition timing, the fuel composition (e.g., percentage alcohol) and/or delivery location (relative amount of port and direct injection) when the up-shift is made, the routine advances to 424. At 424 the relative amount of directly injected ethanol to the total fuel delivery may be increased by an amount determined to abate the potential for knock in the up-shifted conditions. In alternate embodiments the relative amount of direct injection ethanol, in relation to the amount of port injected gasoline, is increased. The routine then returns to the start.

In this way, the fuel delivery can be adjusted in synchronism with (e.g., before or during) the shift to reduce the potential for knock and provide increased fuel flow in the future gear, even when ambient conditions may result in a borderline knock limited condition at the pre-shift fuel delivery conditions.

Figure 5:
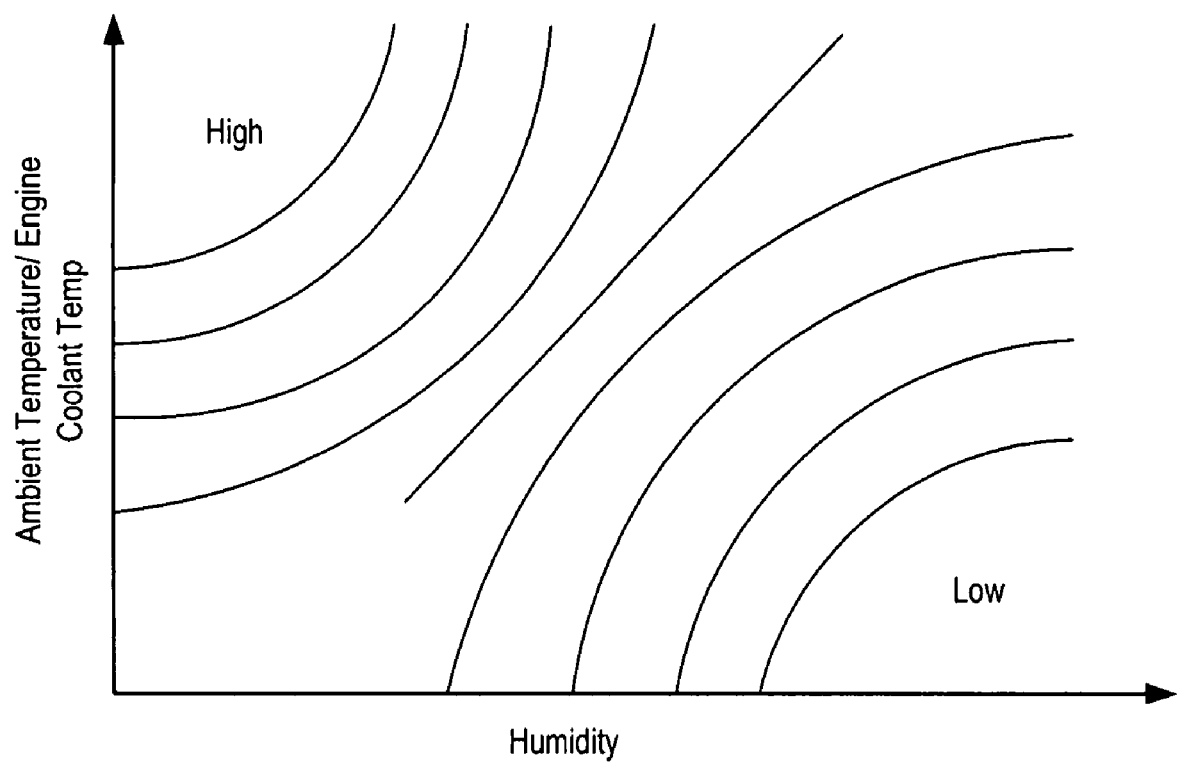
FIG. 5 is a graph that depicts how ambient temperature and humidity of the air affect the potential of knock in the engine.

FIG. 5 shows a graph depicting how ambient humidity and temperature of the air affect the potential of knock in the engine. When the humidity in the air if high but the temperature is low the potential of engine knock occurring is low, due to a decrease in the amount of energy needed for ignition. However when the ambient temperature is high and the humidity is low (i.e. dry air) the potential for knock is high, due to a decrease in the ignition energy. Thus, the routines of FIGS. 3-4 may utilize such relationships in predicting whether borderline knock limits will be experienced in the up-shifted condition.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine and transmission in a vehicle comprising:
    up-shifting the transmission based on whether engine knock limits spark advance at engine conditions after the up-shift.

2. The method of claim 1 further comprising identifying whether engine knock will limit spark advance after the up-shift based on ambient temperature.

3. The method of claim 2 further comprising identifying whether engine knock will limit spark advance after the up-shift based on ambient humidity of the vehicle.

4. The method of claim 3 further comprising determining whether to up-shift based on whether fuel flow or specific fuel consumption after the up-shift is less than fuel flow before the up-shift, the determination taking into account knock limits at engine conditions after the up-shift, and resulting ignition timing retard used in response to the knock limits.

5. The method of claim 4 wherein the up-shift increases a transmission gear ratio from a first fixed gear ratio to a second fixed gear ratio.

6. The method of claim 5 further comprising identifying the knock limits in response to a fuel composition.

7. A method for operating an engine and transmission in a vehicle comprising:
    predicting conditions at an up-shifted condition, the prediction identifying an extent of a knock-related ignition timing retard in the up-shifted condition; and
    up-shifting the transmission based on the prediction, where the up-shift is carried out when the extent of the knock-related ignition timing retard is less than a threshold.

8. The method of claim 7 wherein the prediction is based on ambient temperature.

9. The method of claim 8 wherein the prediction is based on ambient humidity.

10. The method of claim 8 wherein the prediction is based on one or more of a fuel type and inferred octane.

11. The method of claim 10 wherein the up-shift increases a transmission gear ratio from a first fixed gear ratio to a second fixed gear ratio.

12. The method of claim 11 wherein the prediction is based on a fuel composition.

13. A method of operating an engine and a transmission in a vehicle, the engine operating on fuel having a varying composition of ethanol, the method comprising:
    operating the engine with a first fuel composition at a first gear;

up-shifting the transmission from the first gear to a second gear;

during a first ambient condition, operating the engine with the first fuel composition at the second gear; and during a second ambient condition resulting in increased potential for knock at an up-shifted condition as compared to the first ambient condition, operating the engine with a second fuel composition at the second gear, the second fuel composition having an increased alcohol composition compared to the first fuel composition.

14. The method of claim 13 wherein the second ambient condition has increased ambient air temperature compared to the first ambient condition.

15. The method of claim 13 wherein the second ambient condition has decreased ambient humidity compared to the first ambient condition.

16. The method of claim 13 wherein the up-shift is performed responsive to fuel flow predicted after the up-shift at the up-shifted condition compared to fuel flow before the up-shift.

17. The method of claim 13 where the increased alcohol composition includes increased ethanol to gasoline in the fuel.

18. The method of claim 13 where fuel is delivered to the engine from a first port injector and a second direct injector.

19. The method of claim 18 where the direct injector delivers a greater relative amount of ethanol compared to the port injector.

* * * * *